United States Patent
Lee

(10) Patent No.: US 7,684,828 B2
(45) Date of Patent: Mar. 23, 2010

(54) MOBILE TERMINAL AND METHOD FOR OUTPUTTING IMAGE

(75) Inventor: Moon-Heui Lee, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 641 days.

(21) Appl. No.: 11/386,690

(22) Filed: Mar. 23, 2006

(65) Prior Publication Data

US 2006/0217160 A1    Sep. 28, 2006

(30) Foreign Application Priority Data

Mar. 24, 2005   (KR) .................. 10-2005-0024465
Mar. 9, 2006    (KR) .................. 10-2006-0022052

(51) Int. Cl.
    *H04B 1/38*    (2006.01)
(52) U.S. Cl. .................. 455/566; 455/575.1
(58) Field of Classification Search .......... 455/550.1, 455/566, 567, 575.1, 90.1, 247, 351; 715/744, 715/762, 765, 779
    See application file for complete search history.

(56) References Cited

U.S. PATENT DOCUMENTS

| 7,409,230 B2 * | 8/2008 | Bae et al. .................. 455/566 |
| 2004/0204135 A1 | 10/2004 | Zhao et al. |
| 2004/0216054 A1 | 10/2004 | Mathews et al. |

FOREIGN PATENT DOCUMENTS

| JP | 11095782 | 11/2003 |
| KR | 2005 14267 | 7/2002 |

* cited by examiner

*Primary Examiner*—Thanh C Le
(74) *Attorney, Agent, or Firm*—Roylance, Abrams, Berdo & Goodman, L.L.P.

(57) ABSTRACT

A method for, and a mobile terminal configured for, outputting an image together with a background sound are provided. The method for outputting an image in a mobile terminal comprises the steps of setting at least one image and a corresponding background sound, and detecting when a user selects an image for which the background sound was set and outputting the selected image and the corresponding background sound simultaneously. Since the background sound is played simultaneously with the display of the wallpaper, it can satisfy the user's demand for distinctiveness and expression of individuality.

10 Claims, 7 Drawing Sheets

MOBILE TERMINAL AND METHOD FOR OUTPUTTING IMAGE

CROSS-REFERENCE TO RELATED APPLICATION

This application claims the benefit under 35 U.S.C. § 119 (a) of a Korean patent application Nos. 2005-0024465 and 2006-0022052, filed with the Korean Intellectual Property Office on Mar. 24, 2005 and Mar. 9, 2006, respectively, the entire disclosures of which are hereby incorporated by reference.

BACKGROUND OF THE INVENTION

1. Field of the Invention

The present invention relates to a mobile terminal. More particularly, the present invention relates to a method for, and a mobile terminal configured for, outputting an image together with background sound.

2. Description of the Related Art

Generally, "mobile terminals" refer to handheld devices used for data transmissions or wireless communications. These devices comprise cellular phones, Personal Digital Assistants (PDAs), Personal Communication Services (PCS) phones, International Mobile Telecommunication-2000 (IMT-2000) terminals and Global System for Mobile Communication (GSM) terminals.

Mobile terminals have quickly attained worldwide popularity as a necessity for people of all ages. It is a current trend that mobile terminals are becoming smaller, sleeker and lighter to improve portability, as well as implementing various functions and services.

Mobile terminals have gone beyond merely being telephones and now integrate additional functions such as a short message service, memory function for storing and searching for telephone numbers, lock function, alarm/alert function, wallpaper setting, area code search, camera function, DMB and mobile game function. Mobile terminals with such additional functions have brought users greater convenience and benefit to their daily life.

Among the additional functions available, the wallpaper setting function enables mobile users to set any image stored in their mobile terminals, or any picture taken using a camera, as wallpaper for the mobile terminal. Users can directly select a desired image or picture and set it as wallpaper for the mobile phone.

Traditional wallpaper is merely displayed on the display window of a mobile terminal, without any background sound. Thus, users can become easily bored with such wallpaper.

Accordingly, what is needed is a method for, and a mobile terminal configured for, providing background sound suitable to a particular wallpaper, or a user's favorite sound or music, for output during display of the wallpaper to satisfy the user's demand for distinctiveness and expression of individuality.

SUMMARY OF THE INVENTION

Accordingly, exemplary implementations of the present invention address the above-mentioned problems and other problems. An object of the present invention is to provide a method for, and a mobile terminal configured for, outputting background sound during display of an image on a mobile terminal.

Another object of the present invention is to provide a method for, and a mobile terminal configured for, outputting an image expressing individuality.

In order to accomplish the above objects of the present invention, a method for outputting an image in a mobile terminal is provided. The method comprises the steps of setting at least one image and a corresponding background sound, and detecting when a user selects an image for which the background sound was set and outputting the selected image and the corresponding background sound simultaneously.

In accordance with another exemplary aspect of the present invention, a mobile terminal for outputting an image is provided. The mobile terminal comprises a memory for storing predetermined images and corresponding background sounds, and a control unit for detecting when a user selects an image to which a corresponding background sound was mapped and controlling the simultaneous output of the selected image and the corresponding background sound.

BRIEF DESCRIPTION OF THE DRAWINGS

The above and other exemplary objects, features and advantages of the present invention will be more apparent from the following detailed description taken in conjunction with the accompanying drawings, in which.

Throughout the drawings, like reference numbers should be understood to refer to like elements, features, and structures.

DETAILED DESCRIPTION OF EXEMPLARY EMBODIMENTS

The matters exemplified in this description are provided to assist in a comprehensive understanding of various exemplary embodiments of the present invention disclosed with reference to the accompanying figures. Accordingly, those of ordinary skill in the art will recognize that various changes and modifications of the exemplary embodiments described herein can be made without departing from the scope and spirit of the claimed invention. Descriptions of well-known functions and constructions are omitted for clarity and conciseness.

Figure 1:
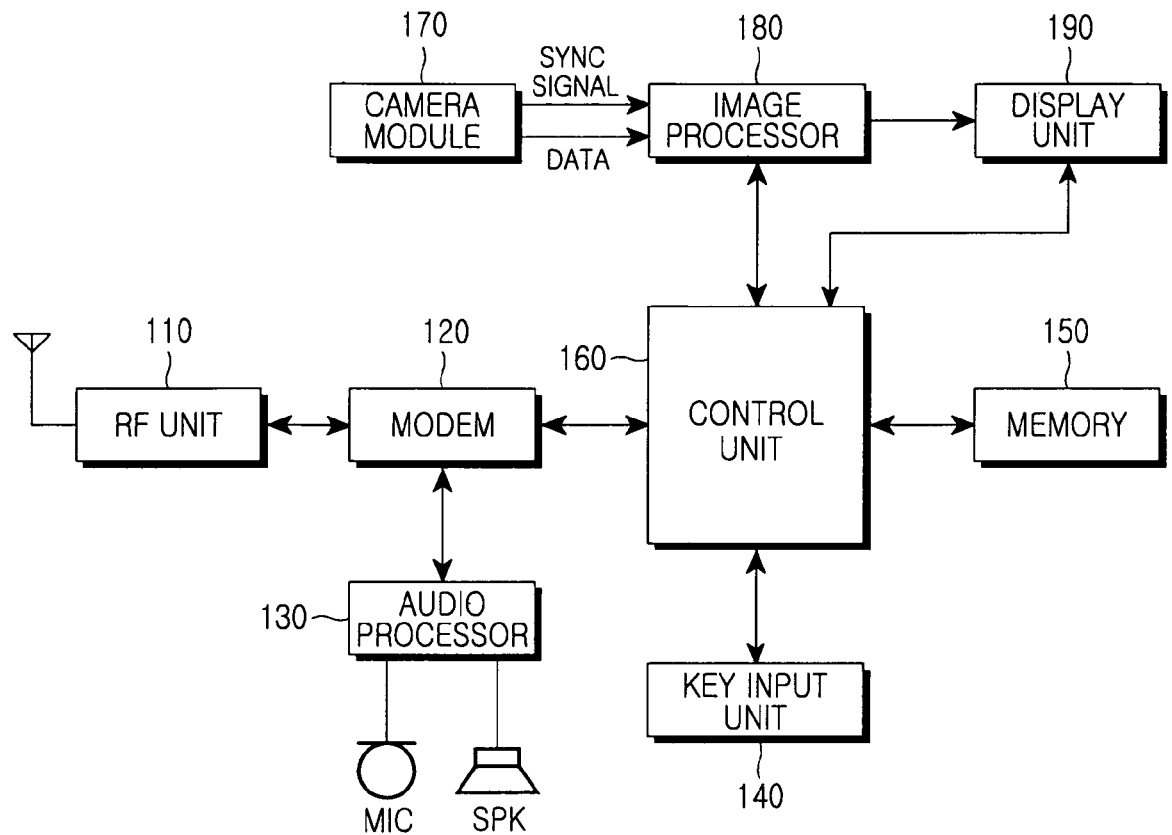
FIG. 1 is a block diagram illustrating a mobile terminal according to an exemplary embodiment of the present invention.

FIG. 1 is a block diagram illustrating a mobile terminal according to an exemplary embodiment of the present invention. Referring to FIG. 1, the mobile terminal comprises an RF unit 110, a modem 120, an audio processor 130, a key input unit 140, a memory 150, a control unit 160, a camera module 170, an image processor 180, and a display unit 190.

The RF unit 110 transmits and receives audio, text, image and control data under the control of a control unit 160. The RF unit 110 comprises an RF transmitter for performing upward conversion and amplification of a transmitted signal and an RF receiver for amplifying a received signal with low noise and performing downward conversion of the signal.

The modem 120 comprises a transmitter for coding and modulating a signal which will be transmitted and a receiver for demodulating and decoding a received signal.

The audio processor 130 modulates an electric signal received from a microphone into audio data, while demodulating encoded audio data received from the RF unit 110 into an electrical signal, and outputting the electrical signal through a speaker. The audio processor 130 preferably comprises a codec to convert a digital audio signal received by the RF unit 110 into an analog signal and reproduces the analog signal through the speaker. The codec also converts an analog audio signal generated from the microphone into a digital audio signal. The codec consists of a data codec for processing packet data and an audio codec for processing an audio signal such as a speech signal. The codec can be provided as an independent element or included in the control unit 160.

In addition, under the control of the control unit 160, the audio processor 130 supplies background sound extracted from memory 150 according to an exemplary embodiment of the present invention.

The key input unit 140 having a key matrix structure (not shown) is provided with alphanumeric keys, function keys, and an external volume key. The key input unit 140 provides a signal to control unit 160 corresponding to the user's key input.

The memory 150 may be composed of program memory and data memory. According to an exemplary embodiment of the present invention, the memory 150 stores programs for controlling general operations of the mobile terminal and various information selected by the user.

The memory 150 also stores predetermined images and background sounds according to an exemplary embodiment of the present invention. The images comprise still images and moving images in Graphics Interchange Format (GIF) or Shockwave Flash (SWF) files which can be set as a wallpaper, a menu display image or a standby mode image. Preferably, the background sounds stored in memory 150 comprise sounds that fit the context of the still images, and the sounds synchronize with the GIF or SWF moving images. For example, when a still image of a dog or a bird is stored in memory 150, the sound of a natural dog barking or bird singing should preferably be stored as the background sound.

The memory 150 can store background sounds synchronized with their respective images. For example, when a GIF image of a swinging bell is stored, a bell ringing sound mapped in synchronization with the GIF image is stored in the memory 150. When a GIF image or SWF flash file showing a barking dog or a singing bird is stored, a dog barking sound or bird singing sound mapped in synchronization with the image is stored in the memory 150. A user can download favorite images and corresponding background sounds to the mobile terminal from a separate server.

The mobile terminal may have two separate memories, that is, an image memory for storing images and a sound memory for storing background sounds.

The control unit 160 controls the overall operation of the mobile terminal. Upon a user's request, the control unit 160 sets at least one image and a corresponding background sound. When the user selects an image for which a background sound was set, the control unit 160 controls the simultaneous output of the selected image and the corresponding background sound.

In other words, when the user enters a request to set an image, the control unit 160 shifts the current mode of the mobile terminal to an image setting mode and displays a list of images and a list of background sounds stored in memory 150 on the display unit 190. The request to set an image can be a request to set a menu display, a wallpaper or the like.

When the user presses a key to select a desired image and background sound from the displayed lists of images and sounds, the control unit 160 extracts the selected image and background sound from the memory 150.

When the user presses an OK key, the control unit 160 links the extracted image and background sound together and stores the image and associated background sound in the memory 150, thereby completing the background sound setting for the selected image.

In one exemplary embodiment, under the control of control unit 160, predetermined images and associated synchronized background sounds are stored together in the memory 150. When the user presses a key to select one of the images stored in memory 150 while in the image setting mode, the control unit 160 extracts a background sound mapped to the selected image from the memory 150. When the user presses a key to confirm that the extracted background sound corresponds to the selected image, the control unit 160 then stores the image and associated background sound in the memory 150, thereby completing the background sound setting for the selected image.

The camera module 170 has a lens (not shown) capable of zooming in and out. The camera module 170 receives image data through the lens. The camera module 170 comprises a camera sensor for converting a photographed optical signal into an electrical signal and a signal processor for converting an analog image signal photographed by the camera sensor into digital data.

In one exemplary embodiment, the camera sensor comprises a charge coupled device (CCD) sensor, and the signal processor comprises a digital signal processor (DSP). The camera sensor and signal processor can be either integrated into a single element, or provided separately as independent elements.

The image processor 180 generates picture data for displaying an image signal outputted from the camera module 170. The picture data can be used as a wallpaper image.

The image processor 180 processes image signals obtained from the camera module 170 in frames. Also, the image processor 180 adjusts the frame image data to conform to certain features, such as size and resolution, which are displayable on display unit 190, and supplies the adjusted frame image data. The image processor 180 comprises an image codec to compress the frame image data displayed on display unit 190 in a preset manner or restore the compressed frame image data to the original frame image data.

In an exemplary embodiment, the image processor 180 has an on screen display (OSD) function and can output OSD data according to the displayed picture size under control of the control unit 160.

The display unit 190 provides a plurality of display data generated by the mobile terminal. The display unit 190 may comprise a liquid crystal display (LCD). When the LCD is a touch screen display, it can also serve as an input device.

The display unit 190 displays image data supplied from the image processor 180 and user data obtained from the control unit 160.

Figure 2:
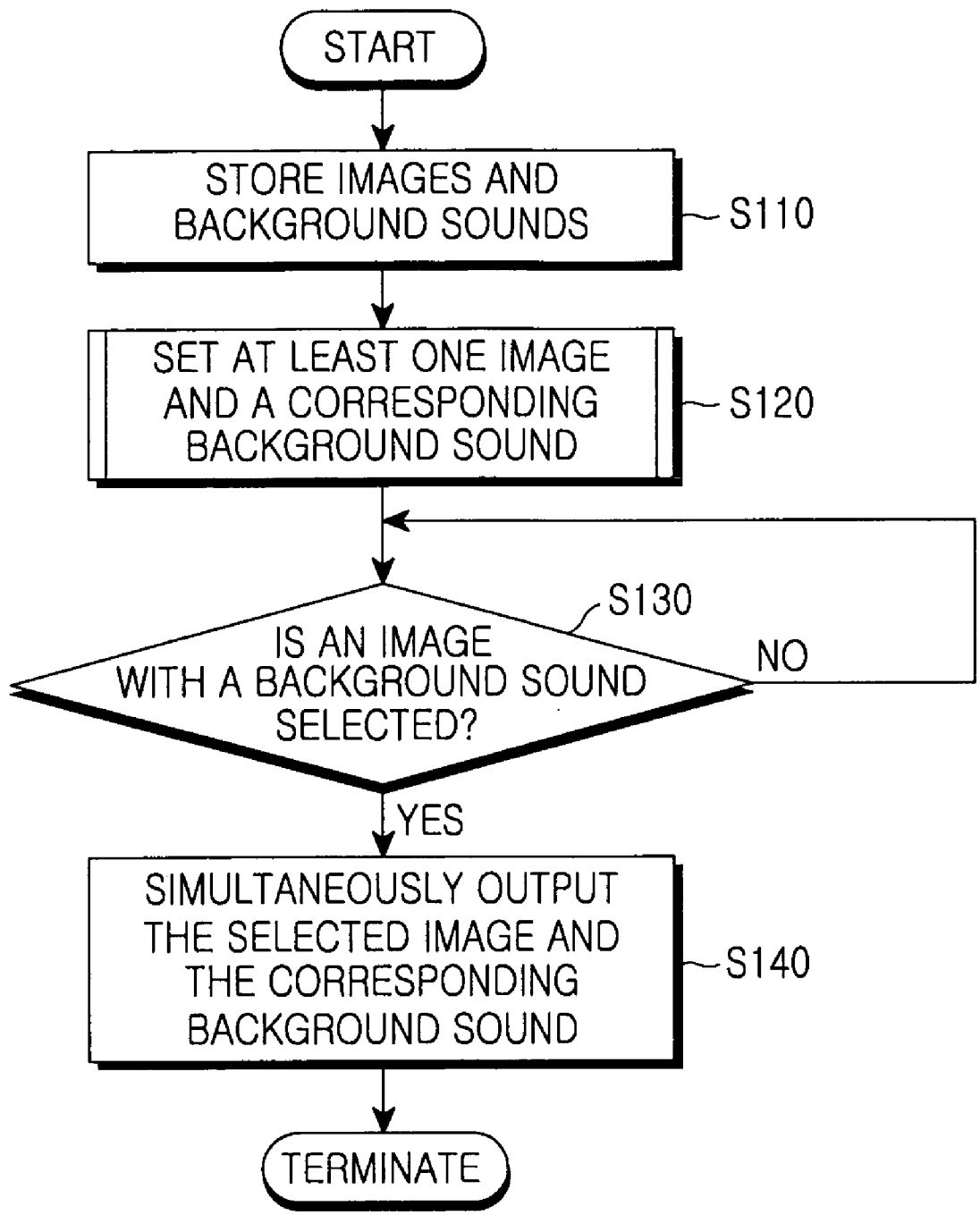
FIG. 2 is a flow chart illustrating a process for outputting an image in a mobile terminal according to a first exemplary embodiment of the present invention.
Figure 3:
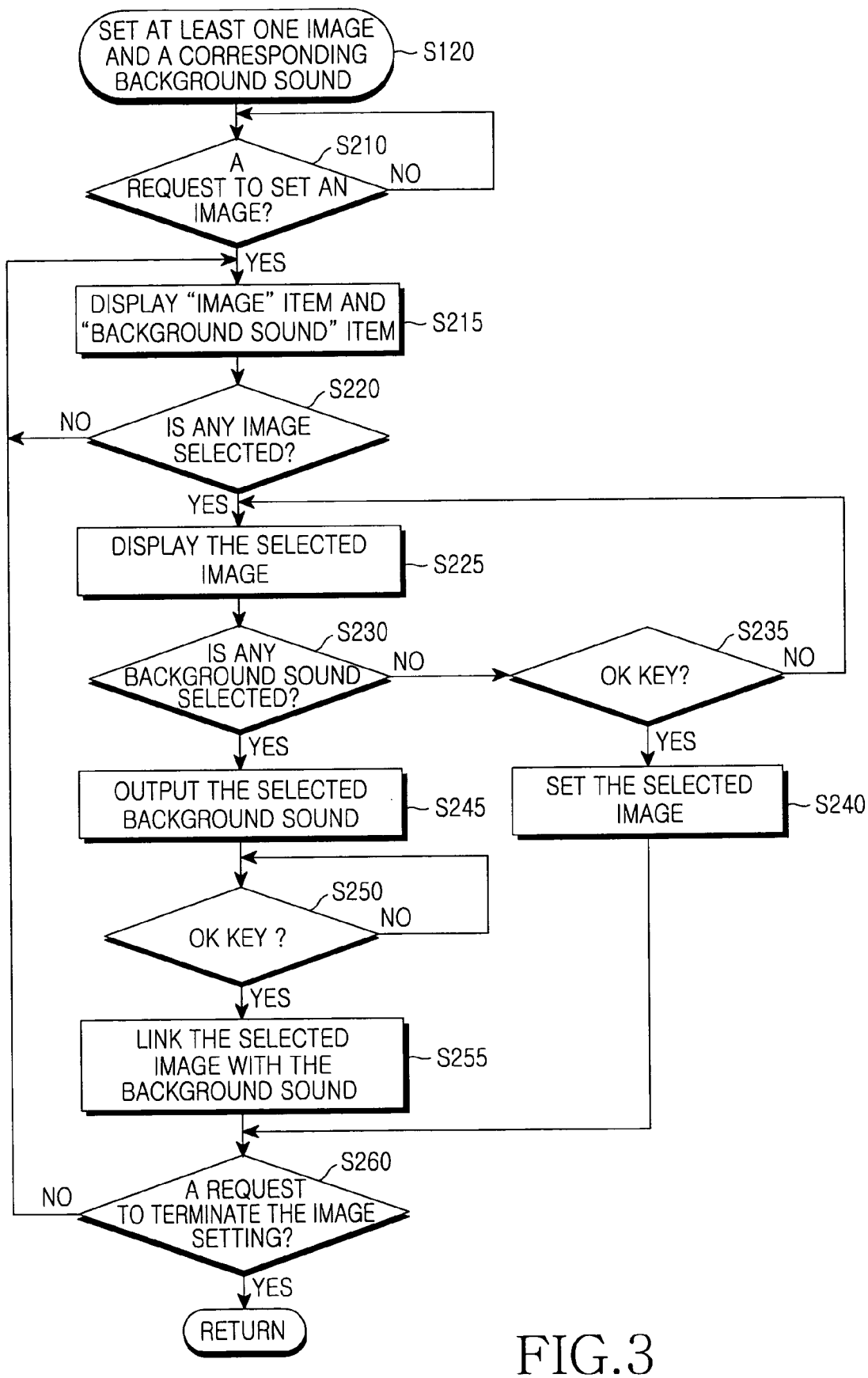
FIG. 3 is a flow chart illustrating in greater detail the step of setting at least one image and a corresponding background sound in the process of FIG. 2.

FIG. 2 is a flow chart illustrating a process for outputting an image on a mobile terminal according to an exemplary embodiment of the present invention. FIG. 3 is a flow chart illustrating in detail the step of setting at least one image and a corresponding background sound in the process of FIG. 2.

Referring to FIGS. 1 through 3, the control unit 160 stores predetermined images and background sounds in the memory 150 at step S110. The images comprise still images and moving images in GIF or SWF flash files which can be set as a wallpaper, a menu display or a standby mode image. In accordance with one exemplary aspect of the present invention, the background sounds stored in the memory 150 comprise various sound data generally stored in mobile terminals and sounds that are associated with the predetermined images.

The control unit 160 sets at least one image and a corresponding background sound according to a user's request at step S120. This step S120 will be explained in more detail with reference to FIG. 3.

The control unit 160 detects whether the user enters a request to set an image at step S210. The request to set an image can be a request to set a menu display, wallpaper or standby mode screen. The user can enter the request by pressing a corresponding menu key.

Upon detecting the request to set an image, the control unit 160 displays an "image" item and a "background sound" item under the wallpaper setting menu on the display unit 190 at step S215.

The control unit 160 detects when the user selects one of the stored images at step S220. At this time, the user can select a desired image by searching the titles of stored images using a direction key.

When any image is selected, the control unit 160 extracts the selected image from the memory 150 and displays the extracted image on the display unit 190 at step S225. The image can be a still image, such as a photograph or a picture, a GIF image, or a SWF image.

The control unit 160 then detects whether the user has entered a request to set a background sound suitable for the displayed image at step S230. That is, the control unit 160 checks whether the user opens the background sound item to select a background sound.

If no request for setting a background sound is selected, the control unit 160 will confirm whether the OK key is pressed at step S235.

When the OK key is pressed directly after the display of the image, the control unit 160 sets the displayed image as a wallpaper, a menu display or a standby mode screen as requested by the user at step S240. If the request to set an image was to set a wallpaper, the displayed image will be set as a wallpaper.

If the user opens the background sound item and selects any background sound, the control unit 160 will extract the selected background sound from the memory 150 at step S245. The user may search the stored background sounds sequentially to determine a suitable sound for the displayed image. When a background sound is selected, the control unit 160 extracts the selected background sound from the memory 150 and outputs the sound through the speaker to be heard by the user.

The control unit 160 confirms whether the OK key is pressed at step S250. When the OK key is pressed, the control unit 160 links the displayed image with the extracted background sound at step S255.

The control unit 160 then confirms whether the user enters a request to terminate the image setting at step S260.

If the request for termination is entered, the control unit 160 will proceed to step S130 in FIG. 2. Otherwise, the control unit 160 will repeat step S215.

After termination of the image setting process in FIG. 3, the control unit 160 checks whether the user selects an image for which a background sound was set at step S130. The user can select one of various stored images for use as a menu display or a wallpaper.

When the user selects an image for which a background sound was set, the control unit 160 displays the selected image on the display unit 190 and, at the same time, outputs the linked background sound to the speaker at step S140.

Figure 4A:
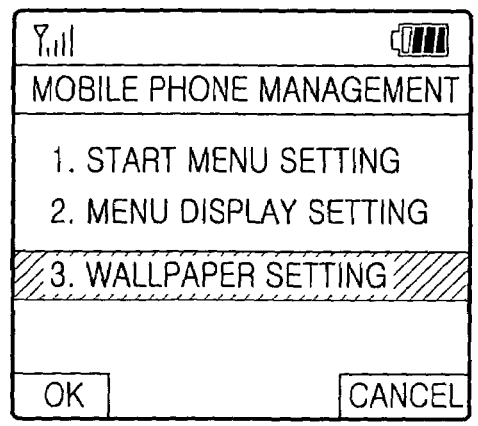
FIGS. 4A through 4C are diagrams illustrating displays of menu for setting an image in a mobile terminal according to the first exemplary embodiment of the present invention.
Figure 4B:
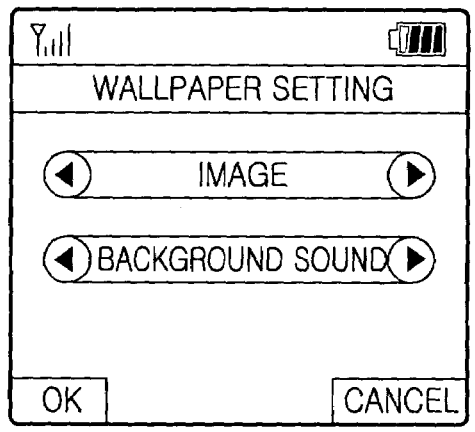
Figure 4C:
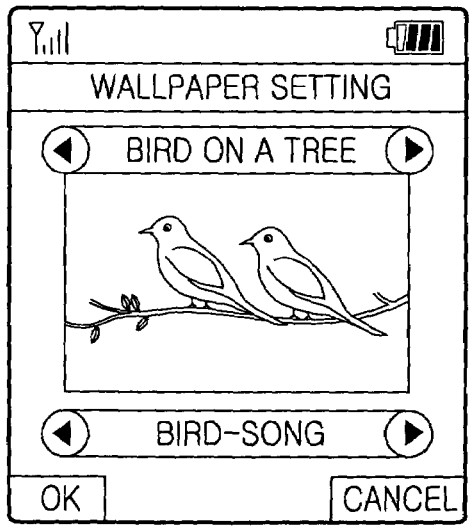

FIGS. 4A through 4C are diagrams illustrating the displays of menus for setting an image in a mobile terminal according to a first exemplary embodiment of the present invention.

FIG. 4A is a diagram illustrating a display of an exemplary embodiment of a mobile phone management menu. The mobile phone management menu contains sub-menus such as "1. Start Menu Setting," "2. Menu Display Setting," and "3. Wallpaper Setting."

The "3. Wallpaper Setting" is a menu item for selecting a specific image as wallpaper and a background sound for play during the display of the wallpaper image on the mobile terminal.

When the user selects "3. Wallpaper Setting" and presses the OK key, the mobile terminal displays two additional menu items, that is, "image" and "background sound" items, as shown in FIG. 4B.

The user can then open the image item and select a desired image using a direction key, as shown in FIG. 4B. Also, the user can open a background sound item and select a background sound that fits the selected image. For example, when the user selects an image entitled "bird on a tree" using a direction key, the mobile terminal displays the selected image as illustrated in FIG. 4C.

FIG. 4C is a diagram illustrating the display of the "bird on a tree" image with "bird-song" selected as a background sound. After selecting the "bird on a tree" image, the user can select a background sound entitled "bird-song," which is appropriate to the bird image. When the user presses the OK key after selecting the image and the background sound illustrated in FIG. 4C, the mobile terminal links the image with the background sound and outputs the linked image with the background sound simultaneously. In other words, the mobile terminal outputs the "bird on a tree" image as wallpaper to the display unit and the background sound to the speaker at the same time.

Figure 5:
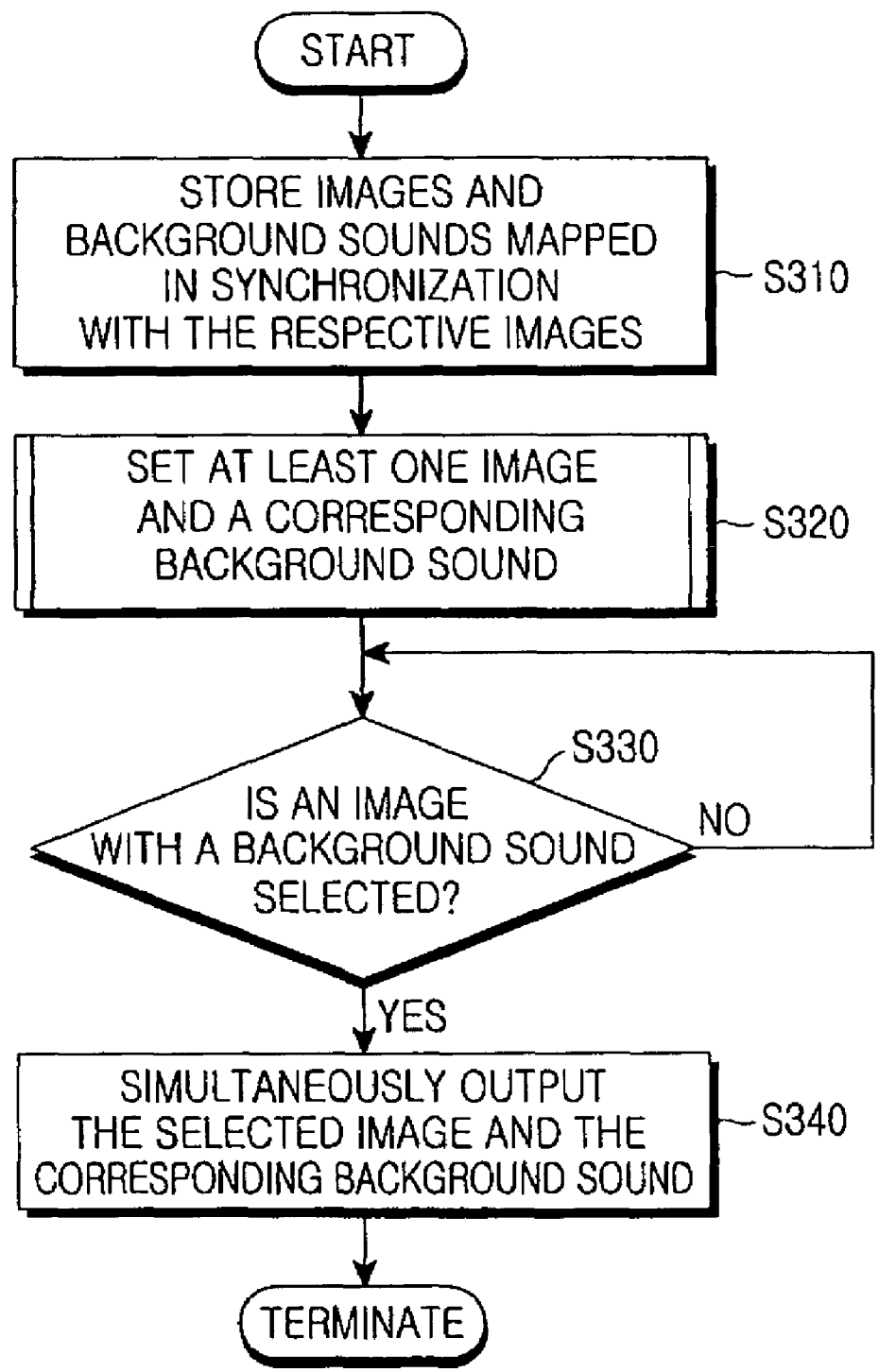
FIG. 5 is a flow chart illustrating a process for outputting an image in a mobile terminal according to a second exemplary embodiment of the present invention.
Figure 6:
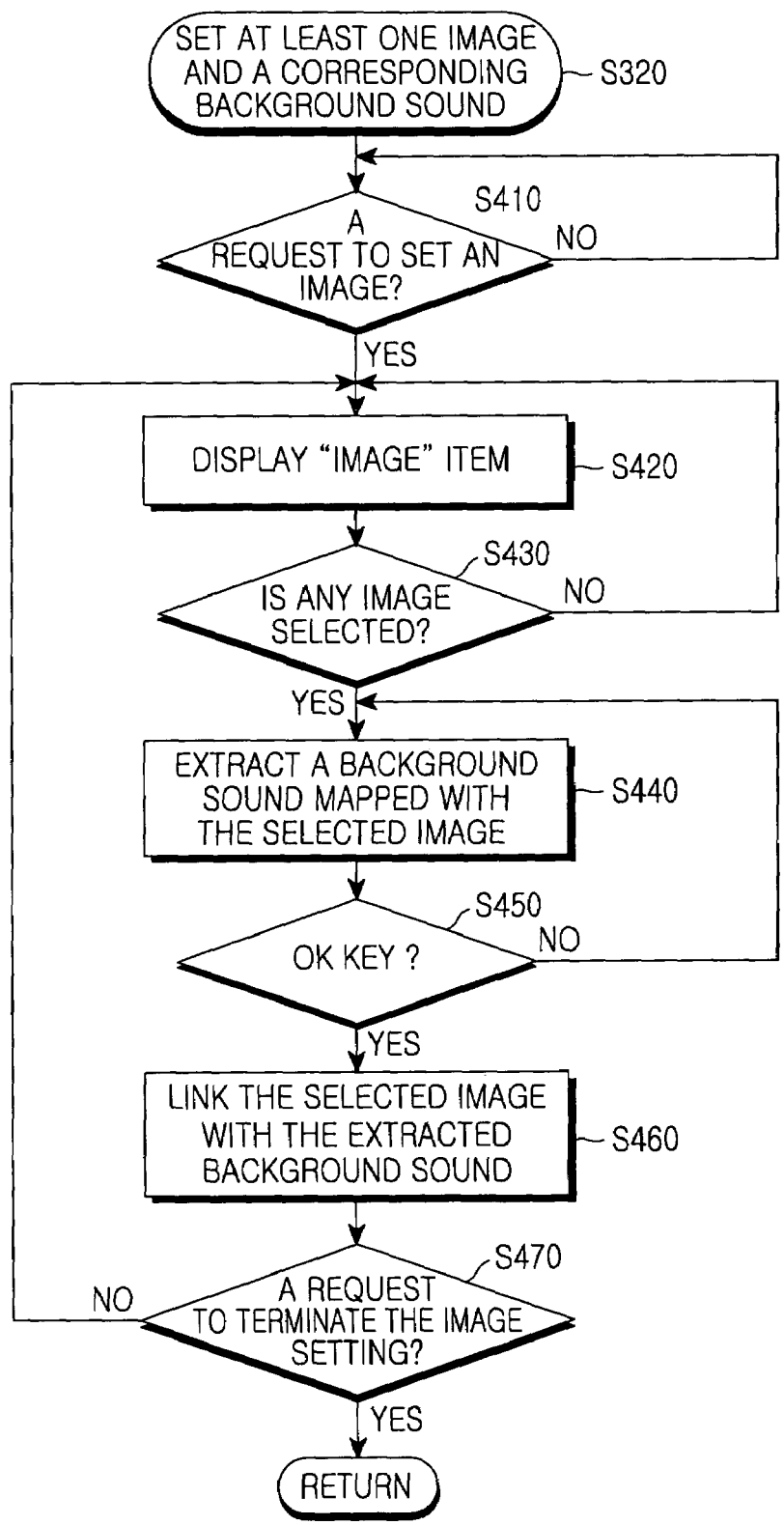
FIG. 6 is a flow chart illustrating in detail the step of setting at least one image and a corresponding background sound in the process of FIG. 5.
Figure 7A:
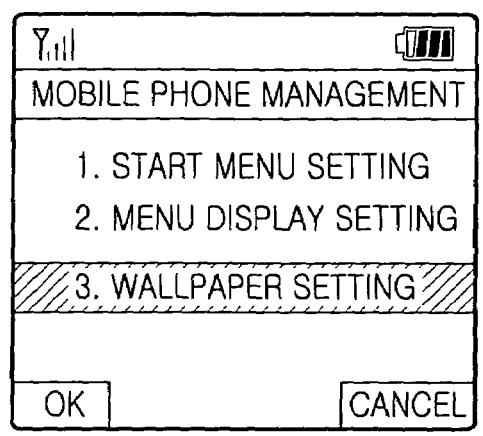
FIGS. 7A through 7C are diagrams illustrating displays of menus for setting an image in a mobile terminal according to the second exemplary embodiment of the present invention.
Figure 7B:
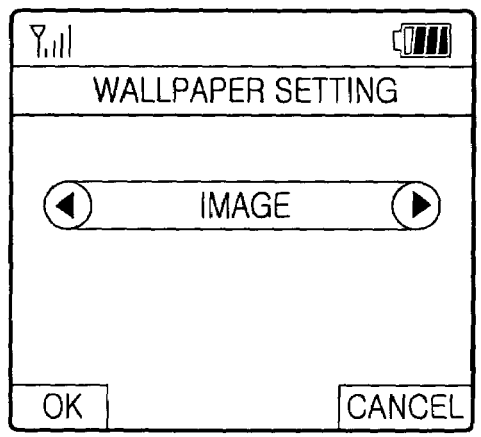
Figure 7C:
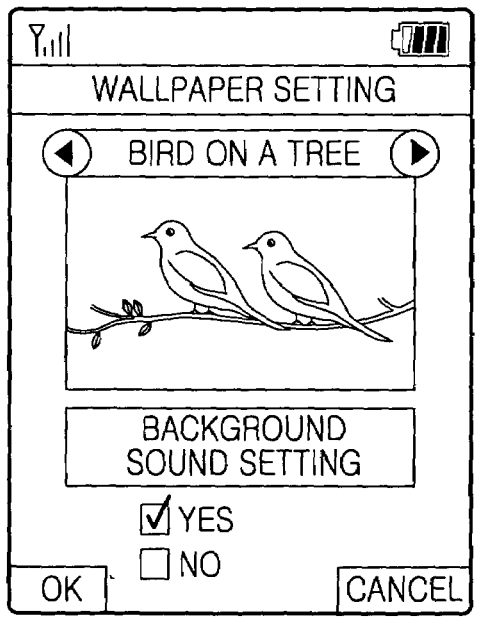

FIG. 5 is a flow chart illustrating a process for outputting an image in a mobile terminal according to a second exemplary embodiment of the present invention. FIG. 6 depicts a flow chart showing in detail the step of setting at least one image and a corresponding background sound in the process of FIG. 5. FIGS. 7A through 7C illustrate displays of menus for setting at least one image and a corresponding background sound in a mobile terminal according to the second exemplary embodiment of the present invention.

The process in FIGS. 5 through 7 will be explained with reference to FIG. 1

The control unit 160 stores predetermined images and background sounds mapped in synchronization with the images in the memory 150 at step S310. For example, when a GIF moving image of a swinging bell is stored, a bell ringing sound mapped in synchronization with the GIF image is also stored in the memory 150. Similarly, when an SWF flash file is stored, a corresponding background sound is stored.

For still images, the control unit 160 maps suitable background sounds with the respective still images and stores the mapped sounds in the memory 150. For example, the control unit 160 stores a bird-song as a background sound mapped to the "bird on a tree" image.

The control unit 160 sets at least one image and a corresponding background sound according to a user's request at step S320. This step S320 will be explained in more detail with reference to FIG. 6.

The control unit 160 detects whether the user enters a request to set an image at step S410. The request to set an image can be a request to set a menu display, wallpaper or standby mode image. The user can enter the request by pressing a corresponding menu key.

Upon detecting the request to set an image, the control unit 160 displays an "image" item under the wallpaper setting menu on the display unit 190 at step S420.

The control unit 160 detects when the user selects one of the stored images at step S430. At this time, the user can select a desired image by searching the titles of stored images using a direction key. Whenever an image is selected, the control unit 160 should preferably extract the selected image from the memory 150 and display the extracted image on the display unit 190.

When any image is selected, the control unit 160 extracts a background sound mapped in synchronization with the selected image from the memory 150 at step S440. At this time, the control unit 160 should preferably output the extracted background sound through the speaker to be heard by the user.

The control unit 160 then determines whether the user has pressed the OK key to finally select the extracted background sound at step S450.

If the OK key has been pressed, the control unit 160 will link the selected image with the extracted background sound (that is, the background sound that is synchronized with the image) at step S460.

The control unit 160 then confirms whether the user enters a request to terminate the image setting at step S470.

If the request for termination is entered, the control unit 160 will proceed to step S330 in FIG. 5. Otherwise, the control unit 160 will return to step S420. If an image is displayable with a background sound selected, the control unit 160 will preferably simultaneously output the selected image and the corresponding background sound at step 340. Alternatively, the control unit 160 will output the corresponding background sound within a related time interval of the output of the selected image.

FIGS. 7A through 7C are diagrams illustrating the displays of menus for setting an image in a mobile terminal according to a second exemplary embodiment of the present invention.

FIG. 7A is a diagram illustrating the display of a mobile phone management menu according to a second exemplary embodiment of the present invention.

The mobile phone management menu in FIG. 7A contains sub-menus such as "1. Start Menu Setting," "2. Menu Display Setting" and "3. Wallpaper Setting."

The "3. Wallpaper Setting" is a menu for setting a specific image as wallpaper and background sound to be played during display of the wallpaper image on a mobile terminal.

When a user selects "3. Wallpaper Setting" in FIG. 7A and presses the OK key, the mobile terminal displays an "image" item under the wallpaper setting menu, as illustrated in FIG. 7B.

In the menu as illustrated in FIG. 7B, the user can select a desired image by searching the titles of images using a direction key. When the user selects an image (for example, an image entitled "bird on a tree") using the direction key, the mobile terminal displays the selected image as illustrated in FIG. 7C. At the same time, the mobile terminal can extract a background sound stored in memory as being mapped to the displayed image and output the extracted sound through the speaker so that the user can confirm whether a suitable sound for the image is outputted.

FIG. 7C is a diagram illustrating the display of the "bird on a tree" image with a menu for setting the sound mapped to the image as a background sound. If the displayed "bird on a tree" image is a GIF or an SWF image, the background sound should preferably be a bird-song in synchronization with the displayed moving image, that is, with the movement of the bird on a tree.

After hearing the background sound played through the speaker, the user can select "yes" and press the OK key as illustrated in FIG. 7C to finally set the background sound. Then the mobile terminal displays the selected image (for example, the "bird on a tree" image) and plays the extracted background sound (for example, bird-song) simultaneously. If the selected image is a GIF or an SWF image, the background sound will be a bird-song in synchronization with the image. If the selected image is a still image, the background sound will be sound or music that fits the context of the image. In other words, the mobile terminal plays the background sound through the speaker simultaneously with the display of the selected image.

As explained above, the user can set a background sound to be played in synchronization with a wallpaper image in the mobile terminal. Since the background sound is played simultaneously with the display of the wallpaper, it can satisfy the user's demand for distinctiveness and expression of individuality.

While the present invention has been particularly shown and described with reference to certain exemplary embodiments thereof, it will be understood by those of ordinary skill in the art that various changes in form and detail may be made therein without departing from the spirit and scope of the present invention as defined by the appended claims.

What is claimed is:

1. A method for outputting an image in a mobile terminal, comprising:

setting at least one image and a corresponding background sound;

detecting when a user selects a specific image for which the background sound was set and outputting the selected image and the corresponding background sound substantially simultaneously; and storing predetermined images and background sounds mapped in synchronization with the respective images in a memory of the mobile terminal;

wherein the setting step comprises:

when a user enters a request to set an image with a background sound, displaying a list of previously stored images and a list of previously stored background sounds; and linking an image and background sound selected from the displayed lists of images and background sounds;

wherein the linking step comprises:

when an image is selected from the displayed list of images, extracting and displaying the selected image;

when a background sound is selected from the displayed list of background sounds, extracting and outputting the selected background sound; and when the user confirms that the background sound is appropriate to the selected image, linking the selected image with the selected background sound.

2. The method according to claim 1, further comprising the step of storing predetermined images and background sounds in a memory of the mobile terminal.

3. The method according to claim 1, wherein the specific image comprises at least one of a wallpaper image, a menu display image, and a standby mode image.

4. The method according to claim 3, wherein the specific image comprises at least one of a still image and a moving image.

5. The method as claimed in claim 1, wherein the step of outputting simultaneously comprises:
- setting at least one image and a corresponding background sound;
- detecting when a user selects a specific image for which a background sound was set; and
- outputting the corresponding background sound within a selected time interval of the output of the selected image.

6. A method for outputting an image in a mobile terminal, comprising:
- setting at least one image and a corresponding background sound;
- detecting when a user selects a specific image for which the background sound was set and outputting the selected image and the corresponding background sound substantially simultaneously; and
- storing predetermined images and background sounds mapped in synchronization with the respective images in a memory of the mobile terminal;
- wherein the setting step comprises:
  - when a user enters a request to set an image with a background sound, displaying a list of previously stored images;
  - when an image is selected from the displayed list of images, extracting a background sound mapped in synchronization with the selected image and outputting the extracted background sound; and
  - when the user confirms that the background sound is appropriate to the selected image, linking the image with the background sound.

7. A mobile terminal comprising:
- a memory for storing predetermined images and background sounds mapped in synchronization with the respective images;
- a control unit for setting at least one image and background sounds corresponding to the images, and, when a user selects a specific image for which the background sound was set, controlling the substantially simultaneous output of the selected image and the corresponding background sound; and
- a display unit for displaying lists of images and background sounds previously stored in the memory when a user enters a request to set an image with a background sound;
- wherein the control unit controls display of a list of the predetermined images previously stored in the memory when the user enters a request to set image with a background sound, and detects when the user selects an image from the displayed list of images, extracts a background sound mapped in synchronization with the selected image from the memory, outputs the extracted background sound, links the selected image with the background sound when the user confirms that the background sound is appropriate to the image, and stores the linked image and background sound together in the memory.

8. The mobile terminal according to claim 7, wherein the specific image comprises at least one of a wallpaper image, a menu display image, and a standby mode image.

9. The mobile terminal according to claim 8, wherein the specific image comprises at least one of a still image and a moving image.

10. The mobile terminal according to claim 7, wherein the control unit detects when the user selects a specific image and a specific background sound from the displayed lists, links the selected image with the selected background sound, and stores the linked image and background sound together in the memory.

* * * * *